United States Patent
Levy (10) Patent No.: US 10,019,488 B2
(45) Date of Patent: Jul. 10, 2018

(54) AUTOMATED IDENTIFICATION OF RECORD HEADER TAGS

(71) Applicant: Carjojo Corp., Campbell, CA (US)

(72) Inventor: Peter Levy, Monte Sereno, CA (US)

(73) Assignee: CARJOJO CORP., Campbell, CA (US)

( * ) Notice: Subject to any disclaimer, the term of this patent is extended or adjusted under 35 U.S.C. 154(b) by 364 days.

(21) Appl. No.: 14/823,854

(22) Filed: Aug. 11, 2015

(65) Prior Publication Data
US 2016/0048520 A1 Feb. 18, 2016

Related U.S. Application Data (60) Provisional application No. 62/036,551, filed on Aug. 12, 2014.

(51) Int. Cl.
*G06F 7/00* (2006.01)
*G06F 17/30* (2006.01)
*G06F 17/27* (2006.01)

(52) U.S. Cl.
CPC ...... *G06F 17/3053* (2013.01); *G06F 17/2745* (2013.01); *G06F 17/30725* (2013.01); *G06F 17/30887* (2013.01)

(58) Field of Classification Search
CPC ................................. G06F 17/30725
See application file for complete search history.

(56) References Cited

U.S. PATENT DOCUMENTS

| | | | |
|---|---|---|---|
| 2006/0101120 A1* | 5/2006 | Helsper | G06Q 10/109 709/206 |
| 2012/0191804 A1* | 7/2012 | Wright | G06F 17/30902 709/217 |

* cited by examiner

*Primary Examiner* — Ajith Jacob
(74) *Attorney, Agent, or Firm* — Stevens Law Group; David R. Stevens (57) ABSTRACT

Methods, devices and apparatuses pertaining to identifying record header tags are described. A method may involve parsing a URL document to identify multiple candidate record header tags and determining scores of an individual candidate record header tag of the multiple candidate record header tags based on record header tag criteria. The method may also involve cumulating the scores to obtain a total score for the individual candidate record header tag. The method may further involve selecting a candidate record header tag of the multiple candidate record header tags as a record header tag for the URL document based on the total score of the individual candidate record header tag.

2 Claims, 6 Drawing Sheets

AUTOMATED IDENTIFICATION OF RECORD HEADER TAGS

CROSS REFERENCE TO RELATED PATENT APPLICATIONS

This application claims priority to U.S. Provisional Patent Application No. 62/036,551, filed on Aug. 12, 2014, entitled "System to Identify Automobile Record Header Tags for Further Processing," which is hereby incorporated by reference in its entirety.

TECHNICAL FIELD

The present disclosure generally relates to information analysis and, more particularly, to methods and systems for automated identification of record header tags.

BACKGROUND

Current methods available for processing information (e.g., records of merchandise for sale) from websites usually begin with human identification of headers of the records. For example, the identification may be processed by a human operator manually entering text into a computer-readable file or program. In some instances, a graphical interface may be utilized allow the human operator to "point and click" on an appropriate record bounding box, which may be interpreted by a computing system to identify record headers. If the human operator identifies two or more records, the computing system may collect information about record headers based on the records identified by the human operator. These techniques, however, are not appropriate when sheer scale makes human identification either inefficient or practically impossible. Further, websites are identified programmatically on-the-fly such that human intervention may not be able to address ahead of time.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Implementations herein relate to methods and systems for identifying record header tags. Implementations in accordance with the present disclosure may parse a Uniform Resource Locator (URL) document to obtain multiple potential record header tags. The multiple potential record header tag may be scored against a set of pre-defined criteria and/or dynamically updated criteria. After the multiple potential record header tags have been processed so that each is associated with one or more respective scores and a total score, an individual potential record header tag may be selected as a "winning tag" among the multiple potential record header tags based on its total score, e.g., the total score of the winning tag being higher than that of any other potential record header tag. The winning tag may be used to further parse the URL document into multiple records. As part of a training process, the multiple records thus obtained are compared with actual records of the URL document. If the multiple records are consistent with the actual records of the URL document, the record header tag may be stored and/or further processed. If the multiple records are not consistent with the actual records of the URL document, another potential record header tag (e.g., another potential record header tag with the second highest total score) may be selected as the new winning tag. In these instances, the criteria may be updated such that the total score of this new winning tag is increased to be higher than any other potential record header tags among the multiple potential record header tags.

Implementations in accordance with the present disclosure may determine record header tags for websites that display multiple records of items of interest (e.g., automobile records) in a list, e.g., a list associated with a webpage of the website. In some implementations, individual records may be isolated and further processed. Potential or candidate record header tags may be dissembled and assigned ratings based on a number of criteria. For example, these criteria may relate to the likelihood of the tag being the correct record header tag. Each tag may then be assigned a respective rating based on the degree of likelihood that the tag is the correct record header tag. The tag with the highest rating may be designated as being most likely the record header tag, e.g., for a webpage, and may be used to identify record boundaries of the list.

Figure 1:
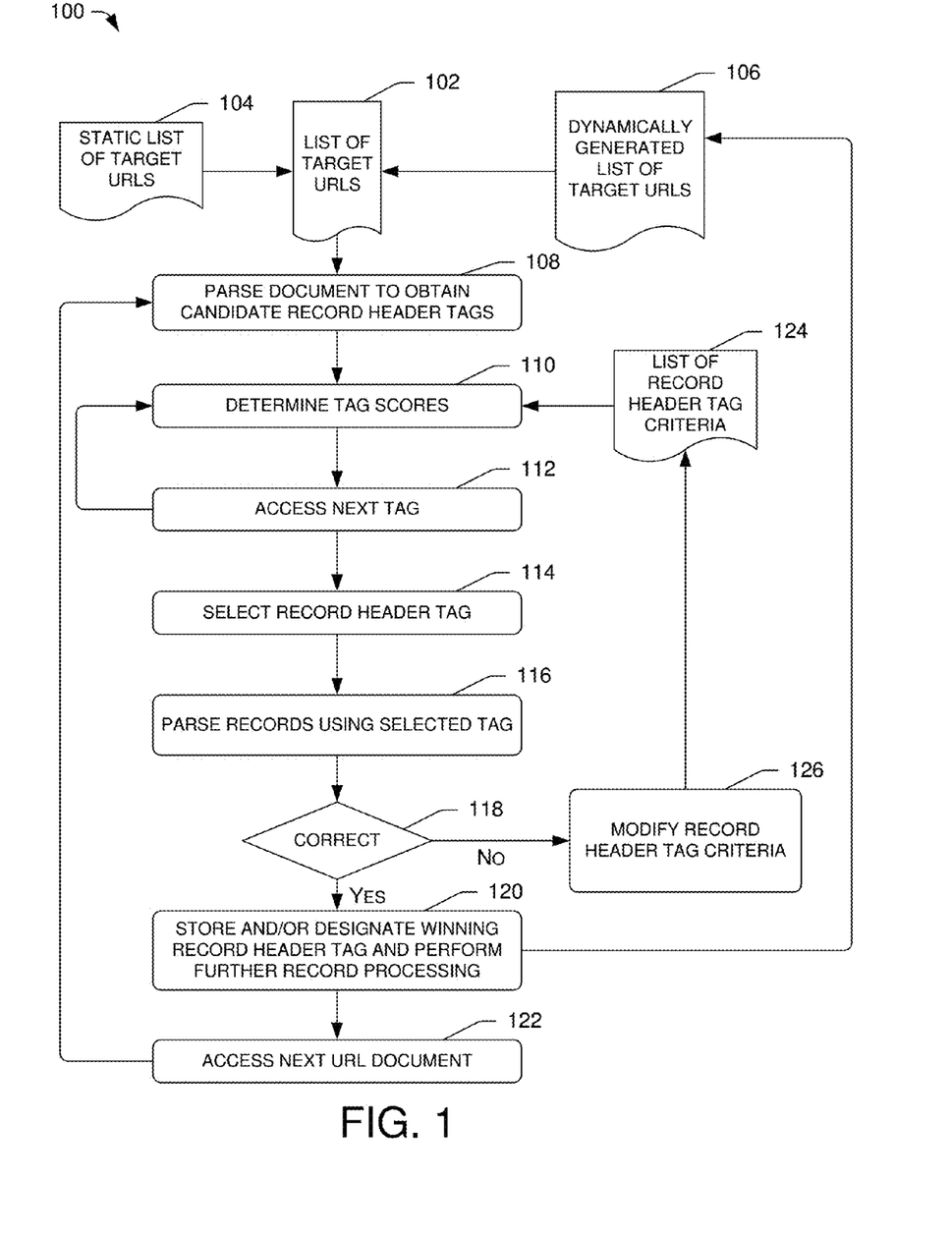
FIG. 1 is a diagram depicting an example scheme in which example embodiments of the present disclosure may be implemented.

FIG. 1 illustrates an example algorithm or scheme 100 in which example embodiments of the present disclosure may be implemented. Example scheme 100 may include one or more operations, actions, or functions as represented by one or more of blocks 108, 110, 112, 114, 116, 118, 120, 122 and 126. Although illustrated as discrete blocks, various blocks of example scheme 100 may be divided into additional blocks, combined into fewer blocks, or eliminated, depending on the desired implementation. Example scheme 100 may be implemented by a computing system such as, for example, computing apparatus 300 to be described below. The computing system may include a server or a collection of servers in a distributed configuration (e.g., cloud computing service, server farm, etc.) or non-distributed configuration.

The computing system may populate a list of target URLs 102 with a static list target URLs 104 and/or a dynamically generated list of target URLs 106. For example, static list target URLs 104 may be created outside of the computing system, while dynamically generated list of target URLs 102 may be generated by the computing system.

Figure 2:
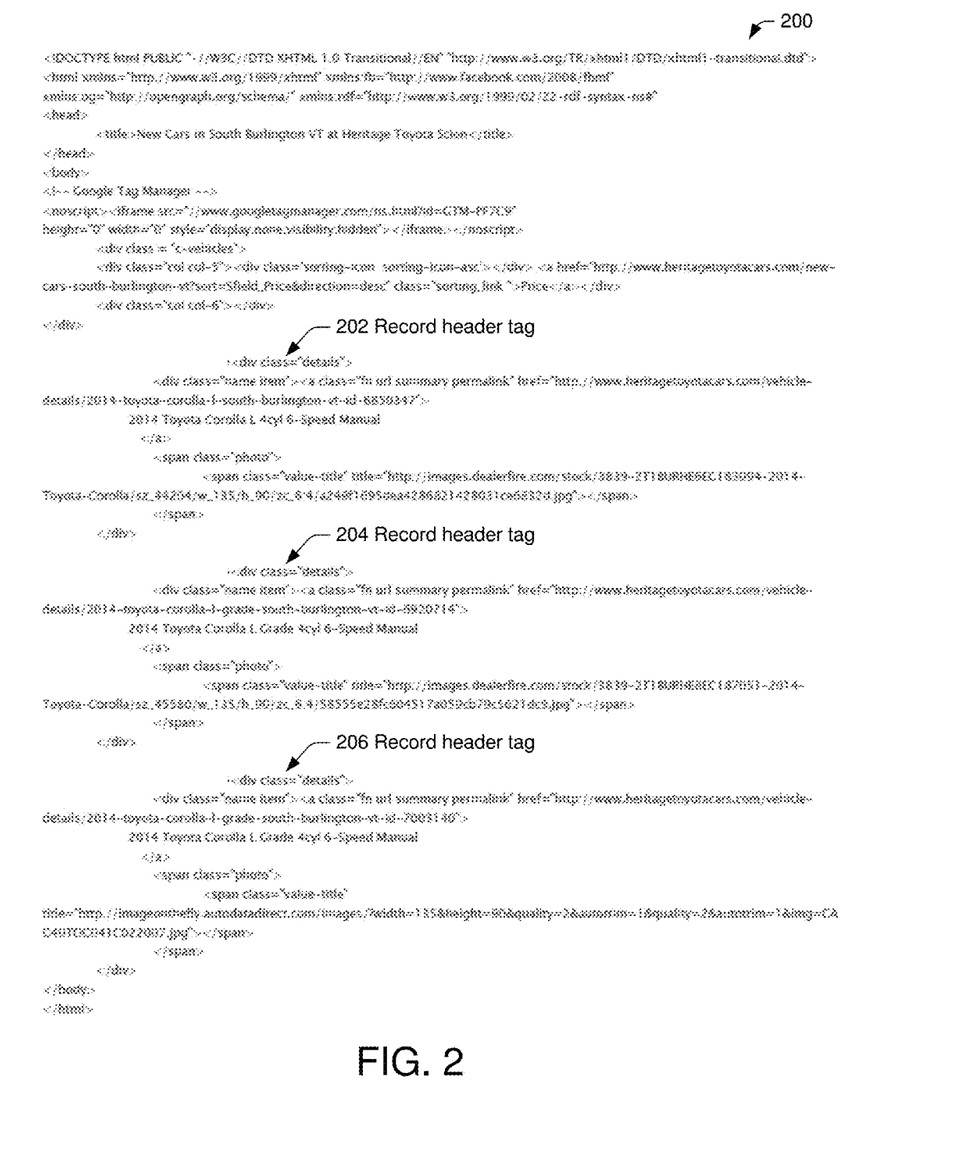
FIG. 2 is an example URL document with identified record header tags in accordance with an embodiment of the present disclosure.

At 108, the computing system may parse a URL document of the list of target URLs 102 to identify candidate record header tags. In some implementations, the URL document may include a HyperText Markup Language (HTML) page containing a list of records. A record may include, for example, text and tags between two record header tags and usually contain structured data whose headings may repeat (e.g., vehicle name, price, engine type). A tag may include an HTML descriptor that describes certain information regarding an HTML page. A tag may be any string on the HTML page. A record header tag may indicate the boundary between records in a HTML page. Accordingly, a candidate record header tag may be a record header tag subject to test and validation. As an example, FIG. 2 shows an example URL document 200 with identified record header tags (e.g., record header tags 202, 204 and 206).

For each candidate record header tag, the computing system may determine a score by evaluating the candidate record header tag against one or more criteria from a list of record header tag criteria 124. At 110, the computing system may score a candidate record header tag on each criterion and sum up the scores for the criteria to arrive at a total score. At 112, the computing system may access a subsequent candidate record header tag in the URL document, and example scheme 100 may be repeated for all candidate record header tags be proceeding from 112 to 110.

At 114, the computing system may select the candidate record header tag with the highest score as the winning recorder header tag. At 116, the computing system may parse the URL document again using the winning/selected tag to obtain discrete record units. At 118, the computing system may test the record units to determine whether they have uniformity of structure and/or whether the winning record header tag delineates actual records of the URL document.

In an event that the winning record header tag appears to be incorrect, the winning record header tag may be flagged for further analysis, e.g., by a human operator, or the process may be re-run to identify another candidate record header tag which has the second highest score, and example scheme 100 may proceed from 118 to 126. At 126, if the candidate record header tag with the second highest total score appears to delineate actual records better than the winning record header tag which has the highest total score, the computing system may modify, refine or otherwise adjust the criteria such that the candidate record header with the second highest scoring tag generates a new total score that is higher than the original winning record header tag that had the highest total score. In these instances, the computing system may further implement one or more machine learning techniques.

In an event that the winning record header tag appears to be correct, then example scheme 100 may proceed from 118 to 120. At 120, the computer system may store the candidate record header tag that is the winning record header tag and/or designate the winning record header tag as a record header tag for the URL document. Additionally, at 120, the computing system may perform further processing on the record units. For example, the record units may be added to the dynamically generated list of target URLs 106. At 122, the computing system may access another URL document, e.g., another list of target URLs. Accordingly, a repeatable loop operation (e.g., from operations 108 to 122) may be implemented in example scheme 100 until all URLs have been processed as described above.

In some implementations, the list of record header tag criteria 124 may include various areas of criteria where each area may include one or more criteria. A candidate record header tag may include one or more strings on an HTML page. For example, a candidate record header tag may be strings preceded by the "<" character and end with the ">" character. In some instances, a candidate record header tags may include a word followed by the "=" character and text immediately following the character. In example URL document 200 shown in FIG. 2, each of record header tags 202, 204 and 206 happens to be <div class="details">.

In some implementations, a candidate record header tag may contain a few alphanumeric characters, e.g., alphabets and/or numbers. These alphanumeric characters may be unique for a record, while multiple strings associated with the alphanumeric characters may be consistent for multiple records. In these instances, the candidate record header tag may include a string excluding the unique characters.

In some implementations, a criteria area may be associated with text string priority. In these instances, the criteria may include key strings, avoiding strings, and a weight for a string based on norms of items of interest in the list (e.g., automobiles) and HTML norms. Key strings may include strings that increase the likelihood that a given tag is a record header tag, while avoiding strings may include strings that decrease the likelihood that a given tag is a record header tag. Key string examples may include strings such as "wrap," "vehicle," or "<div class="yearmakemodel." Avoiding string examples may include strings such as "flyout," "login," "null," or "privacy." In some implementations, text string priority strings may be specific to a certain attribute of the items of interest, e.g., the brand of each item. In these instances, certain strings may be of priority for a brand but not for another brand.

Figure 5:
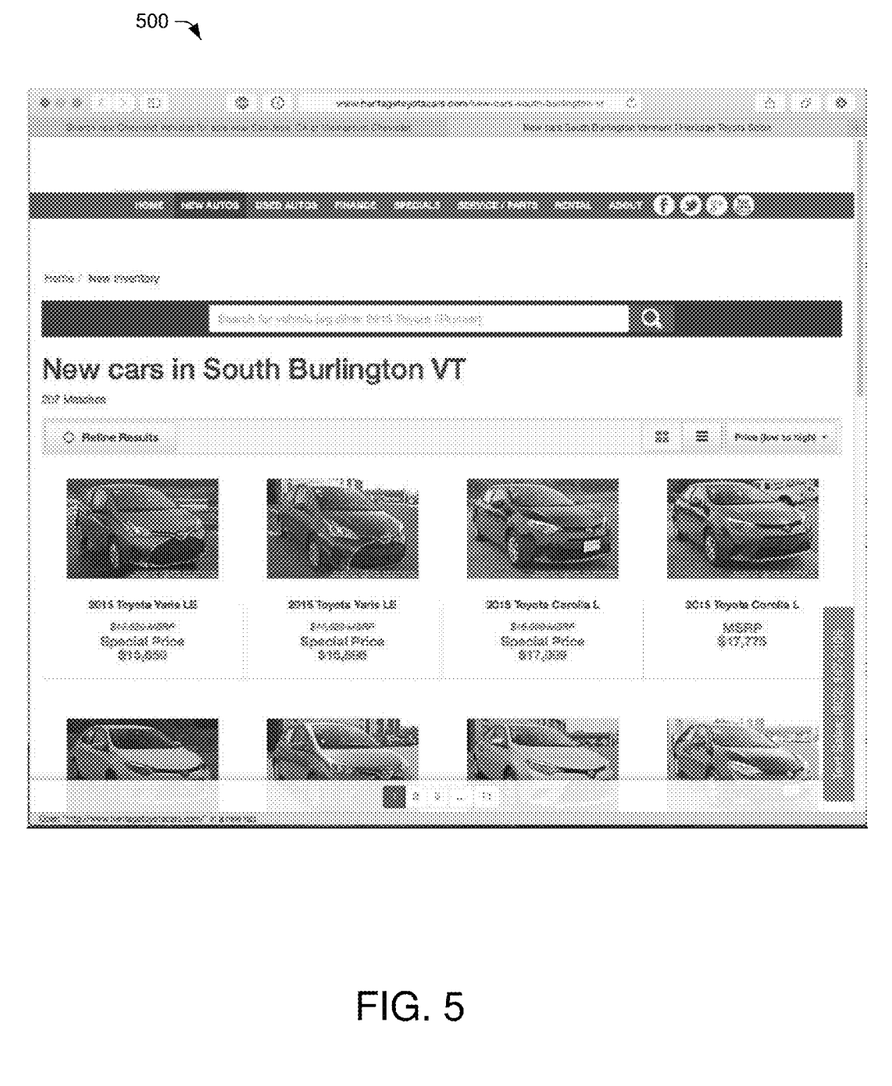
FIG. 5 is an example webpage showing a listing of automobiles for sale.
Figure 6:
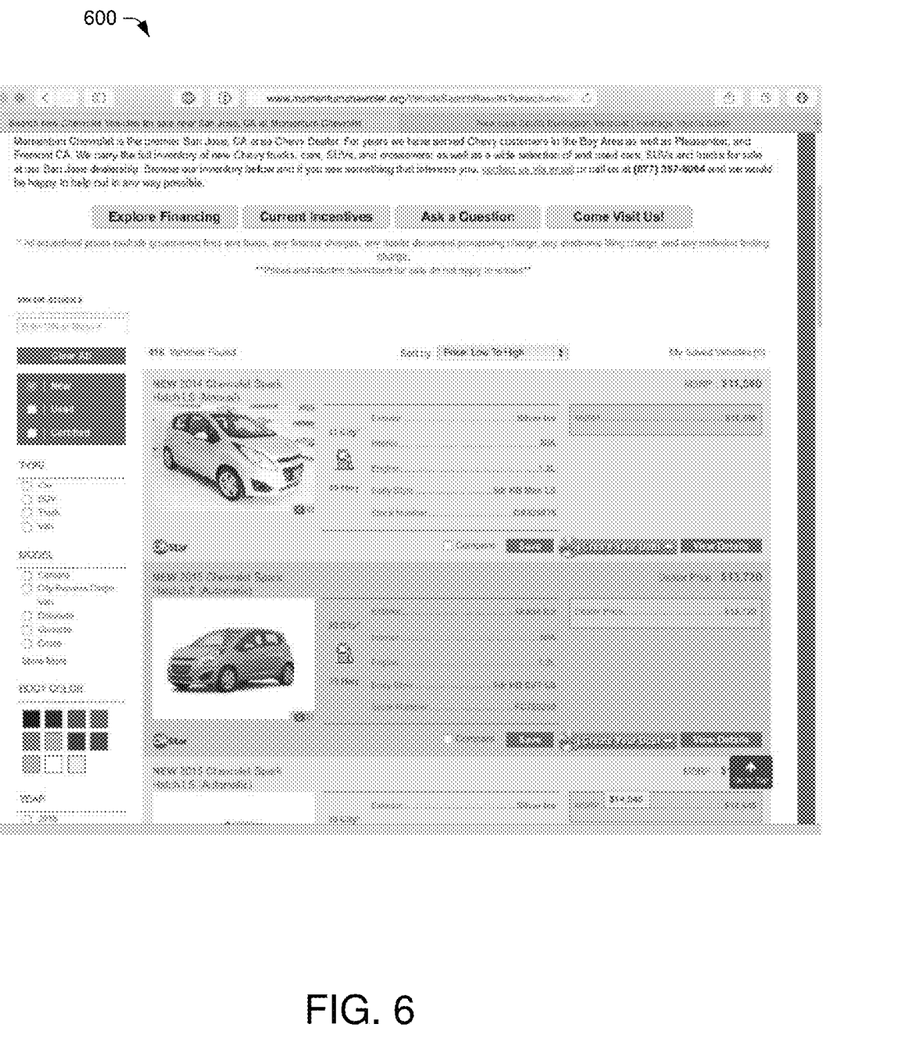
FIG. 6 is an example webpage showing a list of automobiles for sale along with detailed information of each automobile.

In some implementations, a criteria area may be associated with item text/image pattern repetitions. As an example for illustrative purpose and not limiting the scope of the present disclosure, automotive records often appear with consistent use of terms. These terms may include, for example, Vehicle Identification Numbers (VINs), brand names, model names, model years, prices, and several category delimiters such as engine, transmission, drive, discounts and manufacturer's suggested retail price (MSRP). Other repeating patterns may include photographs of vehicles. FIG. 5 shows an example webpage 500 with a list of automobiles for sale. FIG. 6 shows an example webpage 600 with a list of automobiles for sale along with detailed information of each automobile. If there is a set of potential records with the same number of instances of the use of these terms, it is more likely that the candidate record header tag is correct. For example, if a given webpage has fifteen repetitions of one or more VINs and one or more model names, the likelihood increases that a tag separating the fifteen repetitions is the correct record header tag.

In some implementations, a criteria area may be associated with general indicators. For example, the general indicators may include first-found-position percentages. For a candidate record header tag, a first-found-position percentage may indicate the percentage within the length of a HTML document where the first instance of the tag is found. There may be ranges where the likelihood peaks. Typically, a first instance of a tag that occurs between 20%-30% of the way through a document from the beginning of the document may be the peak likelihood. The peak likelihood may change based on overall length of the document. In some instances, the longer the document is, the earlier the peak likelihood is in percentage terms.

The general indicators may include an indicator of a number of times encountered with respect to a candidate record header tag. For example, if a value of the indicator is below or above a certain number, likelihood of correctness of the tag may be low. As another example, the value is between a range around the certain number, the likelihood may be high.

In some implementations, for a candidate record header tag, a divisibility criterion may be measured. The divisibility criterion may indicate that the tag appears a number of times, e.g., multiple of five or ten times. It may be more likely that a given candidate record header tag is correct if it is divisible by five or ten.

In some implementations, the general indicators may include an indicator of the number of times twins are encountered with respect to a candidate record header tag. This indicator may measure how many other candidate record header tags appear the same number of times as a given tag. Based on HTML constructs, the greater the number of different tags that are seen the same number of times in a relatively close proximity, the more likely that one of those tags is the correct record header tag. For instance, a candidate record header tag that has the same number of occurrences as 10 other proximate candidate record header tags is more likely to be correct than one which has the same number of occurrences as three other proximate tags.

In some implementations, the general indicators may further include an indicator of the number of lines and characters with respect to a candidate record header tag. As an example, in the context of automotive records, automotive records may be characterized by a fairly consistent number of characters or lines within records. The narrower is the range from the smallest interval between tag instances to the largest interval between tag instances, the greater is the likelihood of a correct record header tag. If the largest number of characters or lines between two instances of a candidate record header is more than 50% greater than the average or less than 50% of the average number of characters or lines between instances of the same candidate record header, the likelihood significantly may reduce. For example, within one target URL and one candidate record header tag, 10 records are delineated with an average length of 30 lines. If the largest record of the set is greater than 45 lines, the probability of this candidate record header tag being correct drops substantially.

In some implementations, there may be a fairly consistent average number of characters or lines for all sets of records. For instance, 3,000 characters is often the peak likelihood for valid records. As the number of characters or lines deviates from the average, the likelihood that the candidate record header tag is correct decreases. Within a set of candidate record header tags, candidate record header tags appear the same number of times and may be separated by no more than a threshold number of characters. In these instances, priority may be given to the earliest seen candidate record header tags. It is more likely that the first candidate record header tag in the set is the correct record header tag. The above likelihoods/probabilities may be expressed as points and assigned to a candidate record header tag.

Figure 3:
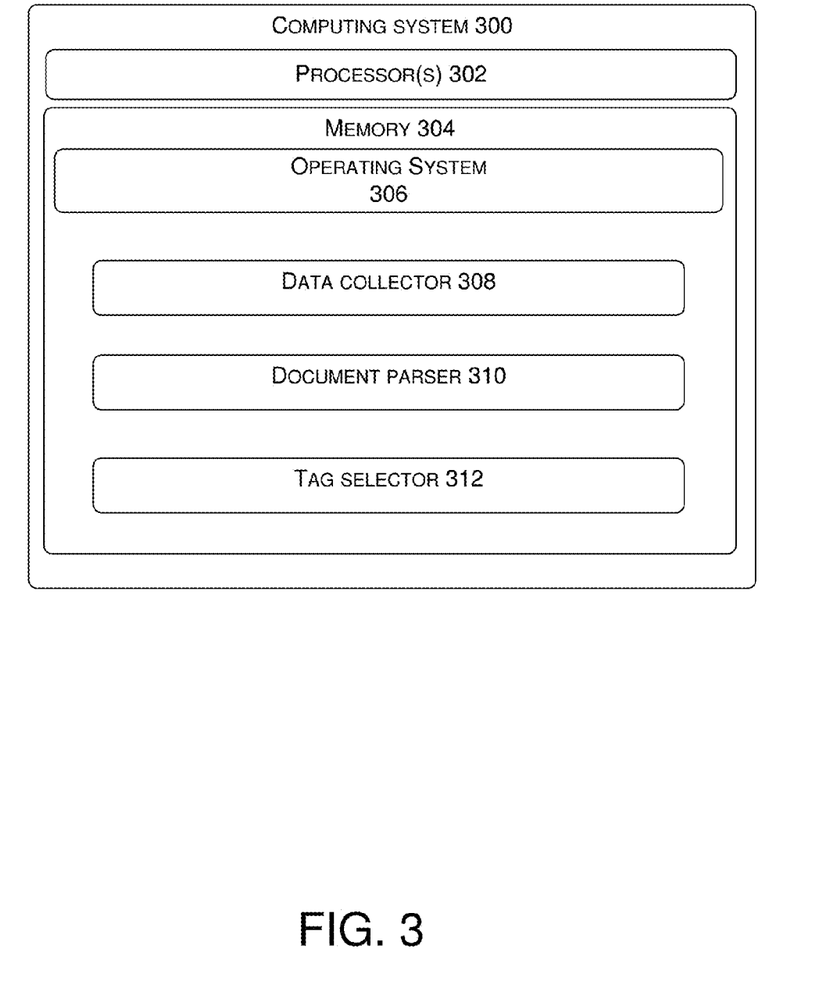
FIG. 3 is a block diagram depicting an example apparatus in accordance with an embodiment of the present disclosure.

FIG. 3 is a block diagram depicting an example computing apparatus 300 in accordance with an embodiment of the present disclosure. Computing apparatus 300 shows additional details of a computing system, which may include additional modules, kernels, data, and/or hardware. Computing apparatus 300 may be an example implementation of the computing system described above with respect to example scheme 100.

Computing apparatus 300 may include one or more processors or processor(s) 302 and a memory 304. The memory 304 may store various modules, applications, programs, or other data. Memory 304 may include one or more sets of instructions that, when executed by processor(s) 302, cause processor(s) 302 to perform the operations described herein for computing apparatus 300. Processors 302 may include one or more graphics processing units (GPU) and one or more central processing units (CPU).

Computing apparatus 300 may have additional features and/or functionality. For example, computing apparatus 300 may also include additional data storage devices (removable and/or non-removable) including computer-readable media. Computer-readable media may include, at least, two types of computer-readable media, namely computer storage media and communication media. Computer storage media may include volatile and non-volatile, removable, and non-removable media implemented in any method or technology for storage of information, such as computer readable instructions, data structures, program modules, program data, or other data. The system memory, the removable storage and the non-removable storage are all examples of computer storage media. Computer storage media includes, but is not limited to, RAM, ROM, EEPROM, flash memory or other memory technology, CD-ROM, digital versatile disks (DVD), or other optical storage, magnetic cassettes, magnetic tape, magnetic disk storage or other magnetic storage devices, or any other medium that can be used to store the desired information and which can be accessed by computing system 300. Any such computer storage media may be part of computing system 300. Moreover, the computer-readable media may include computer-executable instructions that, when executed by the processor(s), perform various functions and/or operations described herein.

Memory 304 may store an operating system 306 as well as various modules such as a data collector 308, a document parser 310 and a tag selector 312. Data collector 308 may provide a list of target URLs. In some implementations, an individual target URL of the list of target URLs may correspond to a URL document. Data collector 308 may also obtain a static list URLs and/or a dynamically generated list URLs, and populate the list of target URLs with the static list URLs and/or the dynamically generated list URLs.

Document parser 310 may parse the URL document to identify a multiple candidate record header tags. For example, the URL document may include an HTML page containing a list of records, with each individual record of the list of records including text and one or more tags between two record header tags. The record header tag may indicate a boundary between two records of the URL document. As an example, in the context of automobile records, the individual record may contain structured data associated with at least one of a brand name of an automobile, a price of the automobile, or an engine type of the automobile.

Tag selector 312 may determine one or more scores for each individual candidate record header tag of the multiple candidate record header tags based on one or more record header tag criteria. For example, the one or more record header tag criteria are associated with at least one of text string priority, text or image pattern repetition, or divisibility with respect to a candidate record header tag.

Tag selector 312 may further cumulate the one or more scores associated with each individual candidate record header tag to obtain a total score for each individual candidate record header tag. Tag selector 312 may also select a candidate record header tag of the multiple candidate record header tags as a record header tag for the URL document based on the total scores of the candidate record header tags.

In some implementations, tag selector 312 may select a candidate record header tag of which the total score is higher than the total score for each of all other candidate record header tags of the multiple candidate record header tags. In these instances, tag selector 312 may further determine whether the selected candidate record header tag delineates the URL document to verify whether the selected candidate record header tag is the correct tag. In response to a determination that the selected candidate record header tag delineates the URL document, tag selector 312 may designate the candidate record header tag as the record header tag for the URL document. In response to a determination that the selected candidate record header tag does not delineate the URL document, tag selector 312 may select an additional candidate record header tag as the record header tag for the URL document based on the total score of the additional candidate record header tag.

In some implementations, document parser 310 may parse the URL document using the selected candidate record header tag to obtain multiple records. In these instances, tag selector 312 may determine that the selected candidate record header tag is correct based on uniformity of structures of the multiple record.

In some implementations, data collector 308 may populate the list of target URLs with a dynamically generated list URLs and/or a static list URLs. In some instances, data collector 308 may further add one or more records associated with the record header tag for the URL document into the dynamically generated list URLs.

Figure 4:
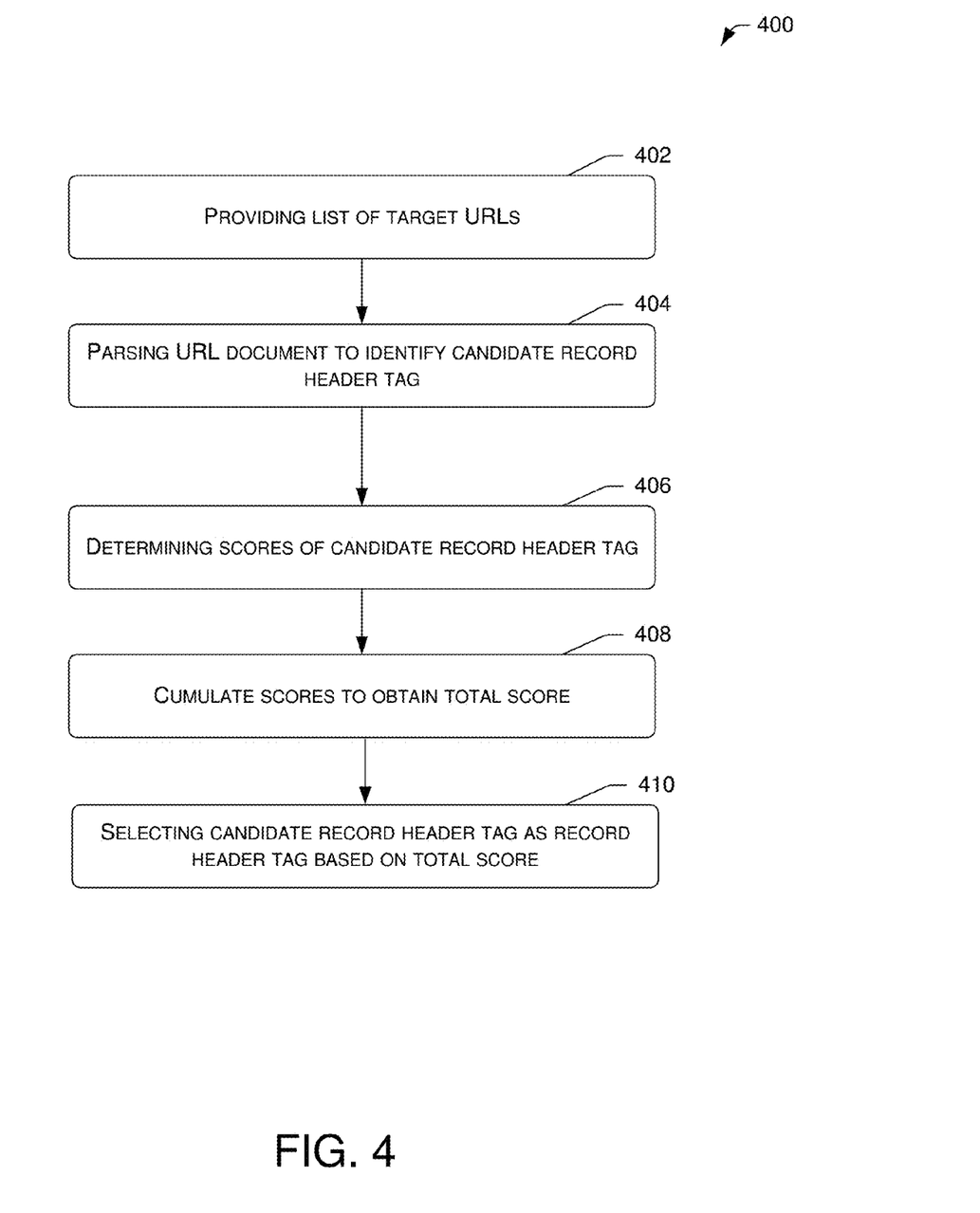
FIG. 4 is a flowchart of an example process in accordance with an embodiment of the present disclosure.

FIG. 4 illustrates an example process 400 in accordance with an embodiment of the present disclosure. Example process 400 may be one of various implementation scenarios based on example scheme 100, and is provided solely for illustrative purpose so that those skilled in the art may better appreciate benefits and advantages provided by the present disclosure. Therefore, the scope of the present disclosure is not limited by example process 400. Example process 400 may include one or more operations, actions, or functions as represented by one or more of blocks 402, 404, 406, 408 and 410. Although illustrated as discrete blocks, various blocks may be divided into additional blocks, combined into fewer blocks, or eliminated, depending on the desired implementation. Example process 400 may be implemented by the computing system described above with respect to example environment 100 and/or by processor(s) 302 of computing apparatus 300. For illustrative purposes, operations of example process 400 are described below in the context of being performed by processor(s) 302 of computing apparatus 300. Example process 400 may begin at block 402.

At 402, processor(s) 302 may provide a list of target URLs. In some implementations, an individual target URL of the list of target URLs may correspond to a URL document. For example, the URL document may include an HTML page containing a list of records. Block 402 may be followed by block 404.

At 404, processor(s) 302 may parse the URL document to identify multiple candidate record header tags. A record header tag may indicate the boundary between records in a HTML page, and a candidate record header tag may be a record header tag subject to test and validation. Block 404 may be followed by block 406.

At 406, processor(s) 302 may determine one or more scores of each individual candidate record header tag of the plurality of candidate record header tags based on one or more record header tag criteria. In some implementations, the one or more record header tag criteria are associated with at least one of text string priority, text or image pattern repetition, or divisibility. For example, these criteria may relate to the likelihood of the tag being the correct record header. The tag with the highest rating may be designated as most likely to be the record header tag and can be used to identify record boundaries of the list. Block 406 may be followed by block 408.

At 408, processor(s) 302 may cumulate the scores to obtain a total score for each individual candidate record header tag. For example, each individual candidate record header tag may be scored on each criterion and the total score may be summed. Block 408 may be followed by block 410.

At 410, processor(s) 302 may select a candidate record header tag of the plurality of candidate record header tags as a record header tag for the URL document based on the total scores of the multiple candidate record header tags. In some implementations, processor(s) 302 may select a candidate record header tag of which the total score is higher than the total score for each of all other candidate record header tags of the multiple candidate record header tags.

Example process 400 may also involve processor(s) 302 determining whether the selected candidate record header tag delineates the URL document, to verify whether the selected candidate record header tag is the correct tag. In response to a determination that the selected candidate record header tag delineates the URL document, example process 400 may involve processor(s) 302 designating the selected candidate record header tag as the record header tag for the URL document. In response to a determination that the selected candidate record header tag does not delineate the URL document, example process 400 may involve processor(s) 302 selecting an additional candidate record header tag as the record header tag based on the total score of the additional candidate record header tag. For example, the candidate record header tag with the second highest total score may be selected. This verification process may continue down the list of the candidate record header tags until the correct tag that delineates the URL document is identified. For instance, if it is determined that the candidate record header tag with the second highest total score does not delineate the URL document (i.e., not the correct tag), the candidate record header tag with the third highest total score may be selected and verified, and so on.

The articles "a" and "an" are used herein to refer to one or to more than one (i.e., to at least one) of the grammatical object of the article. By way of example, "a user" means one user or more than one users. Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code or the like), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

Although the present disclosure is described in terms of certain embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

The invention claimed is:

1. A method comprising:
receiving, by one or more processors of a computing system, a list of Uniform Resource Locators (URLs) with each individual URL in the list corresponding to a respective URL document of a plurality of URL documents;
parsing, by the one or more processors, a first URL document to identify a plurality of candidate record header tags;
determining, by the one or more processors, one or more scores for each individual candidate record header tag of the plurality of candidate record header tags based on one or more record header tag criteria;
cumulating, by the one or more processors, the one or more scores associated with each individual candidate record header tag to obtain a total score for each individual candidate record header tag; and
selecting, by the one or more processors, a candidate record header tag of the plurality of candidate record header tags as a record header tag for the first URL document based on the total scores of the candidate record header tags
wherein the selecting of the candidate record header tag of the plurality of candidate record header tags as the record header tag for the first URL document based on the total scores of the candidate record header tags comprises:
selecting a candidate record header tag of which the total score is higher than the total scores of other candidate record header tags of the plurality of candidate record header tags;
determining whether the selected candidate record header tag delineates the first URL document.

2. One or more computer-readable media storing computer-executable instructions that, when executed on one or more processors, causes the one or more processors to perform operations comprising:
parsing a Uniform Resource Locators (URL) document to identify a plurality of candidate record header tags;
determining one or more scores for each individual candidate record header tag of the plurality of candidate record header tags based on one or more record header tag criteria;
cumulating the one or more scores associated with each individual candidate record header tag to obtain a total score for each individual candidate record header tag; and
selecting a candidate record header tag of the plurality of candidate record header tags as a record header tag for the URL document based on the total scores of the candidate record header tags
wherein the selecting of the candidate record header tag of the plurality of candidate record header tags as the record header tag for the URL document based on the total scores of the candidate record header tags comprises:
selecting a candidate record header tag of which the total score is higher than the total scores of other candidate record header tags of the plurality of candidate record header tags;
determining whether the selected candidate record header tag delineates the URL document;
in response to a determination that the selected candidate record header tag delineates the URL document, designating the selected candidate record header tag as the record header tag for the URL document; and
in response to a determination that the selected candidate record header tag does not delineate the URL document, selecting another candidate record header tag as the record header tag for the URL document based on the total score of the another candidate record header tag.

* * * * *